Nov. 7, 1944. J. B. WEAVER ET AL 2,362,226
SHIP STRUCTURE
Filed June 25, 1943 5 Sheets-Sheet 2

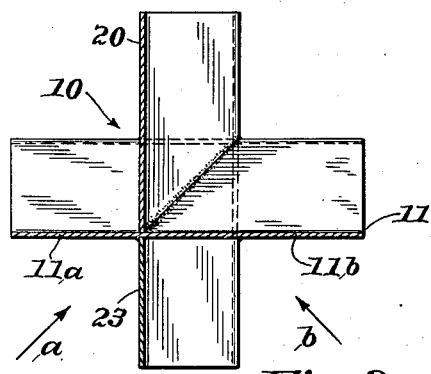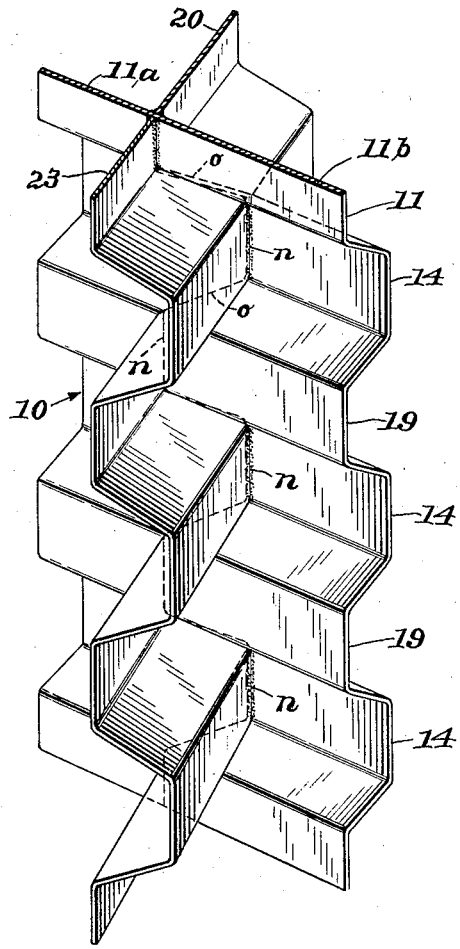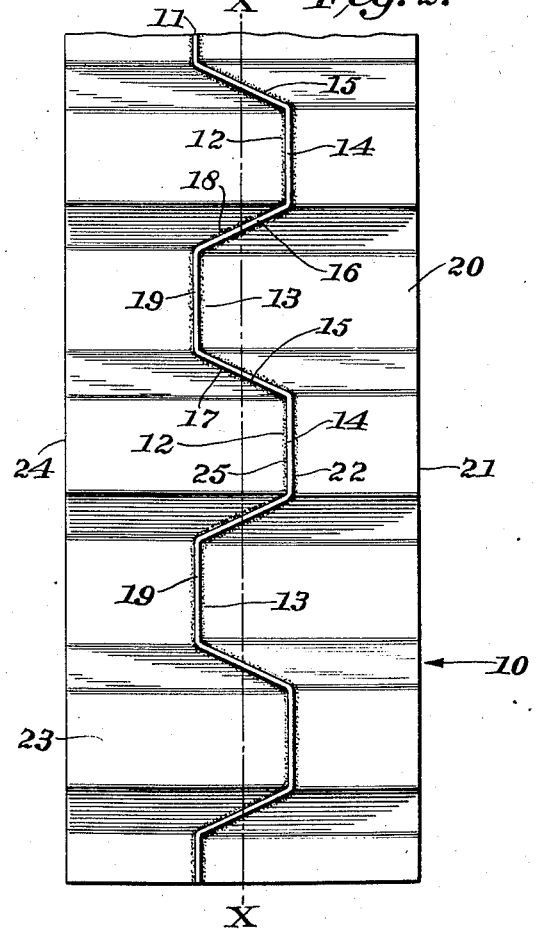

Inventors:
Joseph B. Weaver,
William Starling Burgess,
By Cushman Darby & Cushman
Attorneys.

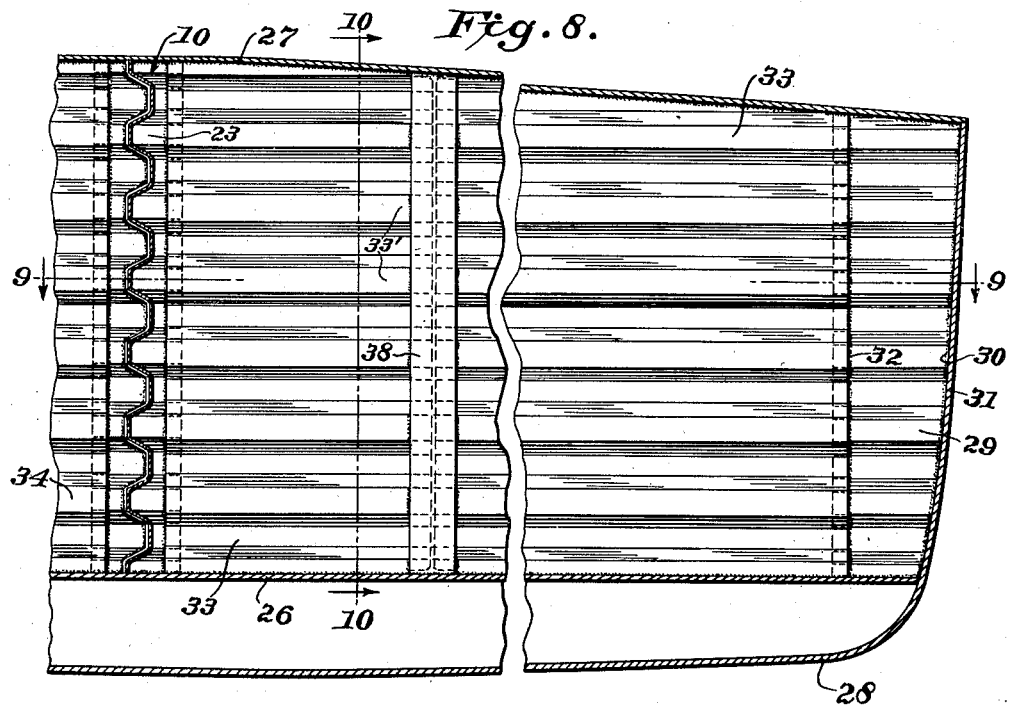
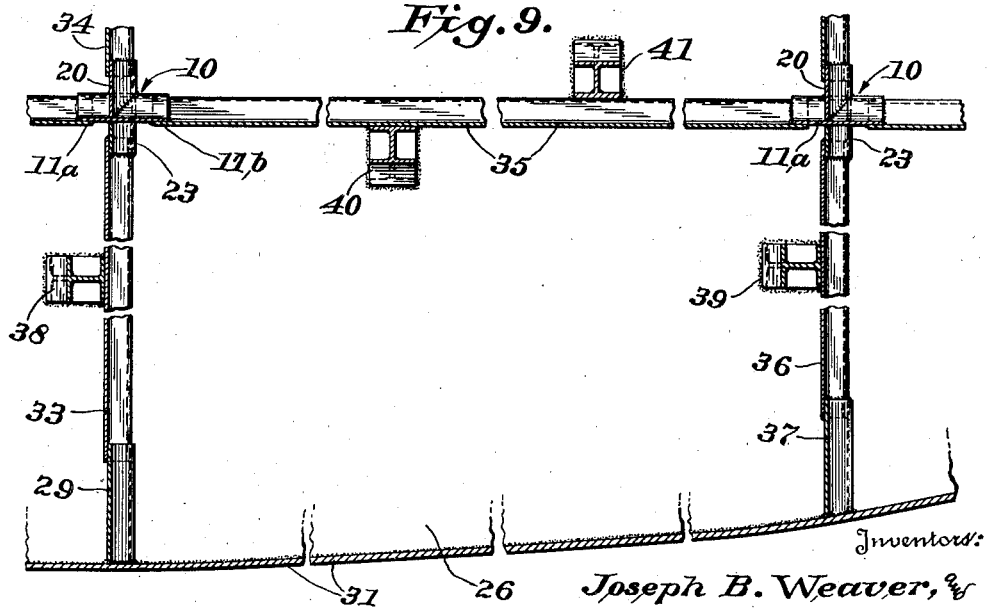

Nov. 7, 1944  J. B. WEAVER ET AL  2,362,226
SHIP STRUCTURE
Filed June 25, 1943  5 Sheets-Sheet 4

Inventors:
Joseph B. Weaver,
William Starling Burgess,
By Cushman Darby & Cushman
Attorneys.

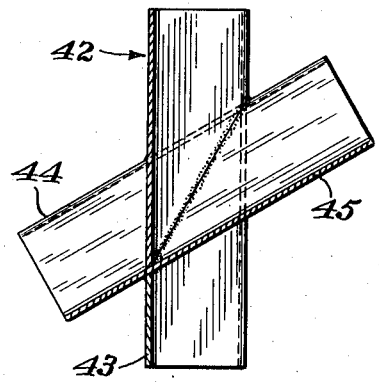
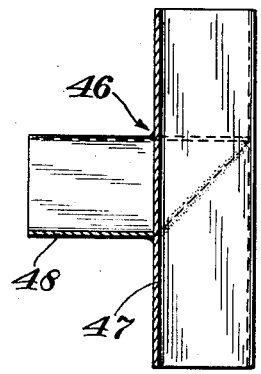
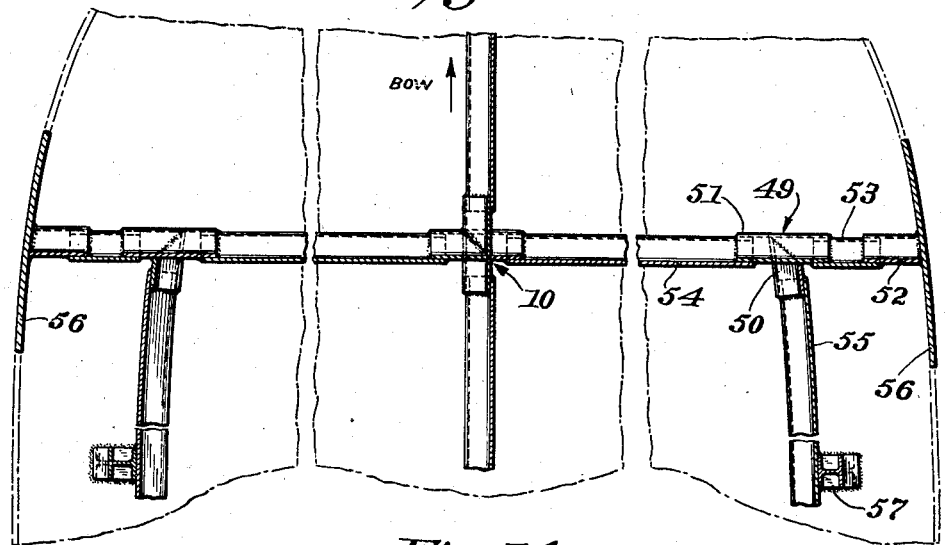
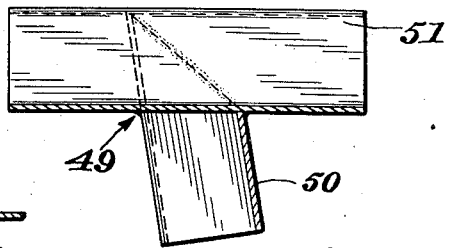
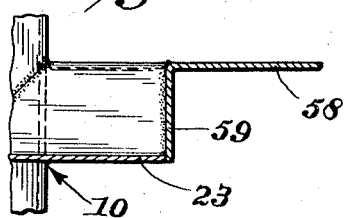

Patented Nov. 7, 1944

2,362,226

UNITED STATES PATENT OFFICE 2,362,226

SHIP STRUCTURE

Joseph B. Weaver and William Starling Burgess, Washington, D. C., assignors to Weaver Associates Corporation, Washington, D. C., a corporation of Maryland Application June 25, 1943, Serial No. 492,288

25 Claims. (Cl. 114—116)

This invention relates to structure for use in the bulkheads, flats, decks, and other parts of ships and has at its main object to provide an arrangement of intersecting plate portions of such character as to eliminate the necessity for the brackets heretofore necessary to fix the angularity of intersections and to transmit the strength of the intersecting members through the intersection. To this end the invention contemplates an intersecting structure comprising members fluted substantially perpendicularly to their axis of intersection and interfitted one with the other and welded together to provide a substantially continuous joint throughout the length of the intersection.

In the case of bulkhead structure, which is used as an example in the accompanying drawings, the intersecting structure may be an integral part of longitudinal and transverse bulkhead plates, or it may be made as a column to which separate bulkhead plates may be secured. The latter arrangement, being more convenient and adaptable, has been used by way of illustration in the drawings, to which reference will now be made. In the drawings, Figure 1 is a plan view of a column, or bulkhead intersection, in accordance with the invention;

Figure 2 is an elevation of the column of Figure 1 as seen from the right of that figure;

Figure 3 is a perspective view of the column of Figures 1 and 2;

Figure 8 is a partial vertical transverse section of a ship's hull equipped with bulkheads in accordance with the invention;

Figure 9 is a section substantially on line 9—9 of Figure 8;

Figure 11 is an end view of another form of intersecting structure;

Figure 12 is an end view of a further form of intersecting structure;

Figure 13 is a fragmental horizontal section of a ship's hull equipped with bulkheads in accordance with the invention;

Figure 14 shows on an enlarged scale an intersecting structure which appears in Figure 13;

Figure 15 is a fragmental plan view of another form of bulkhead structure;

Figure 4:
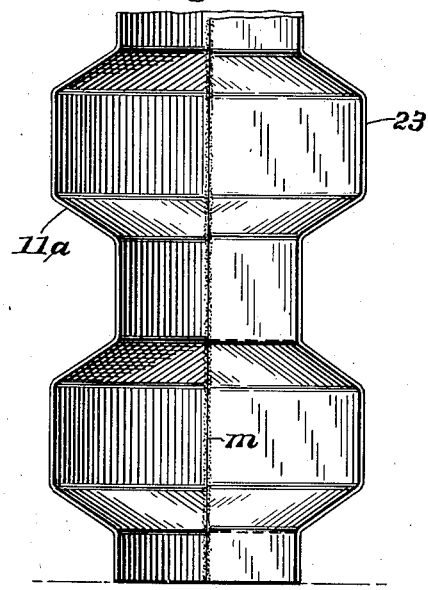
Figure 4 is an elevation of the column looking in the direction of the arrow $a$, Figure 1.

Referring first to Figures 1 to 5, the illustrated column is designated as a whole by the reference numeral 10. The column comprises a main portion 11 constituted by an elongated rectangular plate provided with horizontally extending uniform flutes or corrugations 12 and 13, the term "horizontal" being used with reference to the disposition of the flutes when the column is set up in use. The flutes 12 include rectangular lateral walls 14, all of which lie in the same vertical plane, and rectangular top and bottom walls 15 and 16 which join the lateral walls 14 at internal angles of 135°, as here shown. Walls 15 and 16 continue in rectangular bottom and top walls 17 and 18 of the flutes 13 which have rectangular lateral walls 19 all in the same vertical plane. As here shown, the distance between adjacent edges of adjacent lateral walls 14 is about twice the height of the said walls and the same relationship exists as regards the lateral walls 19. All walls 14 and 19 have the same height and the distance between the vertical plane of walls 14 and that of walls 19 is about the same as the height of the said walls, and the flutes are symmetrical with respect to the central longitudinal line $x$—$x$ (Figure 2) of member 11. The flutes consist entirely of planar walls, as here shown.

Reference numeral 20 designates a plate portion of the same length as and fluted substantially like plate portion 11 and having a vertical outer lateral edge 21 and an inner lateral edge 22 profiled to interfit with the flutes of member 11 with the flutes of both elements lying substantially between common horizontal planes. The edge 22 is butted substantially continuously against the side of member 11 with member 20 substantially rectangularly related to the latter and the two are joined by continuous welds on both sides of member 20 and with the line of member 20 which corresponds to the line $x$—$x$ of member 11 in a plane which includes the latter and is at right angles to member 11. A plate portion 23, fluted substantially as the member 20, has a vertical lateral edge 24 and a lateral edge 25 profiled reversely as the edge 22 interfitted with member 11 exactly opposite member 20 and welded thereto with its flutes aligned with the flutes of member 20. There is thus provided a cruciform column, as most clearly appears in Figure 1, with four equal wings 11a, 20, 11b, and 23. Line $x$—$x$ indicates also the axis of the column or intersection. Member 11 may, for example, have a width of four feet and in such case, the combined width of members 20 and 23 may also be four feet. In such case an appropriate height for the vertical flute walls 14 and 19 is one foot.

Figure 6:
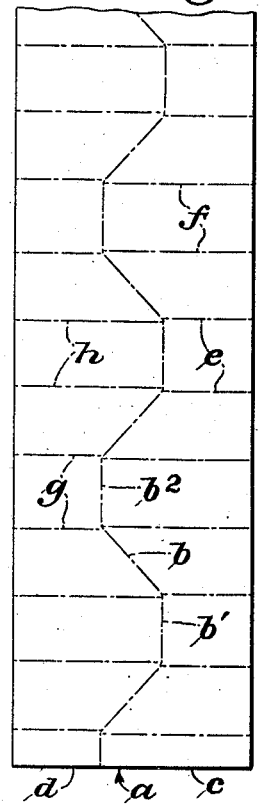
Figure 6 is a face view, on a reduced scale, of a plate from which certain of the elements of the column are derived according to preferred manufacturing procedure.
Figure 7:
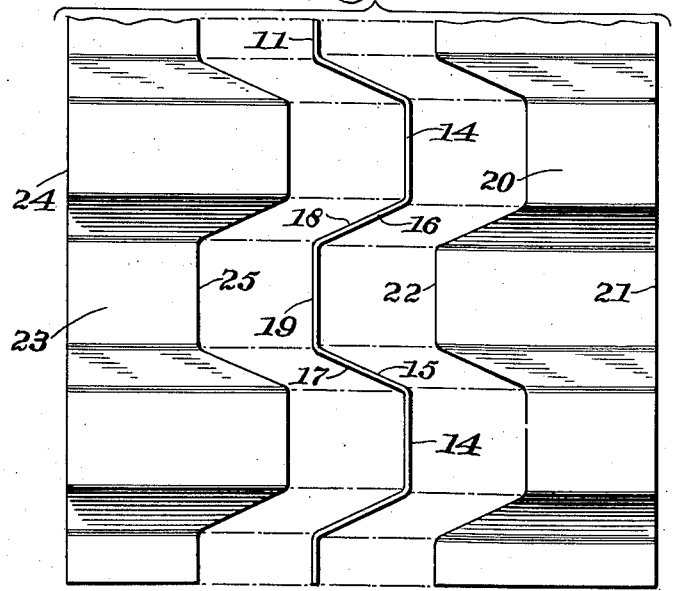
Figure 7 is an elevation showing the column in process of assembly.

Figure 6 shows how the wings 20 and 23 may both be derived from a single flat strip of plate $a$ by mean of a single cut on a line $b$ which is laid out symmetrically with respect to the central longitudinal line of the plate and so contoured as to give the required profiles 22 and 25 for interfitting with the flutes of member 11 when the severed sections $c$ and $d$ are fluted by bending on the lines $e$, $f$, and $g$, $h$. The spacing between lines $e$ and between lines $g$ is the same and is equal to the outside height of a flute wall 14 or 19 of member 11. The spacing between lines $f$ and $h$ is the same and is equal to the inside height of a plate wall 14 or 19 minus twice the thickness of the plate $a$. The portions $b'$ and $b^2$ of the line $b$ are spaced apart transversely of the strip a distance equal to the distance between the planes which respectively include the inside faces of walls 14 and the outside faces of walls 19. With these factors established, the remaining portions of line $b$ establish themselves and upon severing the sections along line $b$ and then bending along the transverse lines at angles of 135°, the resultant wings 20 and 23 may be positioned relative to member 11 as indicated in Figure 7 and then butted against members 11 to provide continuous lines of contact with the latter.

Thus, while the flutes of wings 20 and 23 differ somewhat in dimensions from those of member 11 for the purpose of keeping the flutes of these components substantially between common parallel planes, they may be said to have substantially the same contour.

Figure 5:
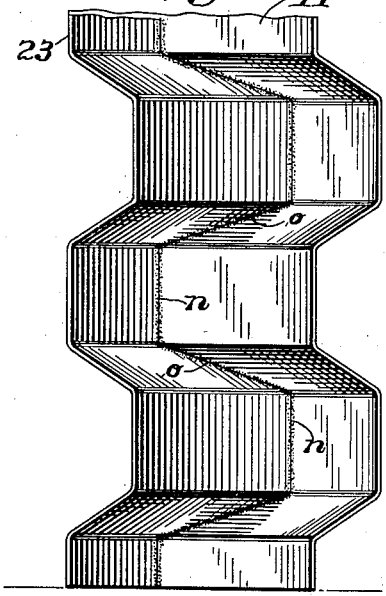
Figure 5 is an elevation of the column looking in the direction of the arrow $b$, Figure 1.

In Figure 4 the weld fillet $m$ is seen to lie in a vertical plane, whereas in Figure 5 the fillet appears zigzag with vertical portions $n$ and connecting oblique portions $o$, which are indicated also in Figure 3.

The flutes of the intersected members are of substantial depth and their joined top and bottom wall portions sufficiently approach the horizontal to serve the function of the usual horizontal brackets, which latter can thus be dispensed with with a consequent great saving in weight and labor costs. Of course, the more nearly the said top and bottom wall portions approach the horizontal, the more nearly they become the counterpart of the replaced brackets. However, for a given depth of flute the inclined disposition of the top and bottom walls is preferred as reducing weight and being at the same time entirely adequate as regards resistance to stresses. Inclination is also desirable for the reason that drainage is thereby facilitated when the structure is washed down in the case of either wet or dry cargo ships. Horizontal surfaces, such as those of brackets, are difficult to clean and will not drain properly, causing corrosion. Therefore, the internal angles of the flutes are preferably greater than 90°, for example 135° as here shown.

These plate elements of the column units may be fluted in accordance with specifications on presses at the plant and there assembled, or the various plate members may be fluted on brakes on the job, if desired, and then assembled.

In Figure 8 a column 10 is shown in vertical disposition between the floor 26 and deck 27 of the ship's hull 28, the longitudinal axis of the column being in this instance in the central longitudinal plane of the hull. Referring also to Figure 9, the wings 11a and 11b extend fore and aft and the wings 20 and 23 extend transversely of the hull. Directly opposite wing 23 a margin plate 29, fluted exactly as wing 23, has one lateral edge 30 fitted and secured against the inner surface of the side 31 of the hull, the flutes of the margin plate being in exact alignment or register with the flutes of the wing 23. The inner lateral edge 32 of the margin plate is vertical. Reference numeral 33 designates a bulkhead plate fluted exactly as wing 23 and margin plate 29 and lapped with both and welded continuously on both sides. A two-inch lap is ordinarily used.

Like the members of the column 10, the margin plate may be conveniently shaped and pressed at the plant, whereas the bulkhead plate can be brought to form by means of a brake on the job. As here shown, the wing 23, margin plate 29, and bulkhead plate 33 provide a complete seal between the floor and the deck.

In Figure 9, reference numeral 34 designates a bulkhead plate like plate 33 extending between wing 20 of the column and a margin plate (not shown) like the plate 29.

In Figure 9 a second column 10 is shown disposed to the right of the first in the longitudinal central plane of the hull, the wing 11a of the second column being joined with the wing 11b of the first by a fluted longitudinal bulkhead plate 35 whose flutes mate with the column wings and are lapped and welded thereto along all edges. Plate 35 provides a complete seal between the floor and deck. Reference numeral 36 designates a bulkhead plate connecting the wing 23 of the right-hand column 10 with a margin plate 37.

Figure 10:
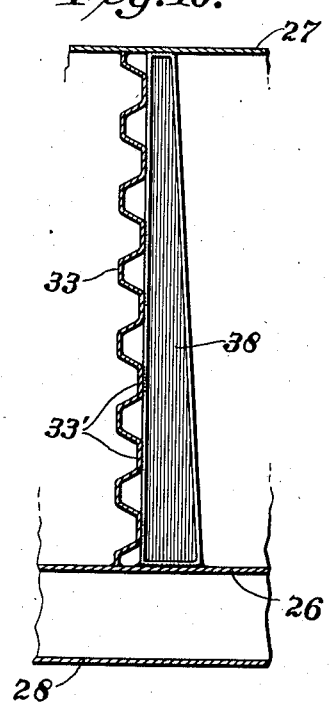
Figure 10 is a section substantially on line 10—10 of Figure 8.

Vertical stiffeners may be associated with the intermediate portions of the bulkhead plates. In Figures 8, 9, and 10, reference numeral 38 designates such a stiffener associated with the plate 33. As here shown, the stiffener is in the form of an upwardly tapering I beam with its ends secured to the floor and deck and with one flange extending vertically and welded against the lateral walls 33' of alternate flutes. A similar stiffener 39 is associated with the bulkhead plate 36 in exactly the same manner. Similar stiffeners 40 and 41 are shown associated with the longitudinal bulkhead plate 35, these stiffeners being spaced longitudinally and disposed on opposite sides of the plate.

Another advantage of the fluted type of bulkhead resides in its ability to distort without rupture. For example in the case of an explosion, the flutes of the bulkhead plates enable the plates to bulge or collapse considerably without tearing, thus helping to maintain a closed condition which may be at least temporarily effective. Where stiffeners are used, their disposition should be such as to offer as little positive interference as possible to the distortion of the bulkheads under explosive force. For example, referring to Figure 9, an explosion in the compartment between bulkheads 33 and 36 will be positively resisted by the stiffener 38 in its immediate vicinity, whereas the bulkhead plate 36 may, under excessive pressure, break away from the stiffener 39, bulging to the right while still substantially maintaining its edge connections so that the pressure can be considerably relieved while substantial tightness is maintained. Similarly, plate 35 can break away from stiffener 40, although positively resisted in the immediate vicinity of stiffener 41.

The intersecting structures may be other than cruciform. For example, in Figure 11, the column 42 is in the form of an X. Reference numeral 43 designates a main member which is like the member 11 of the first embodiment. The interfitting edges of the wings 44 and 45 are, however, so shaped as to intersect the main member at a minor angle of 60°.

In Figure 12, the intersecting structure of column 46 is in the form of a T. The main member 47 may be the same as the member 11 of Figure 1, and the wing 48 may be the same as the wing 23, the other wing of Figure 1 being omitted. A structure or column of substantially this type is generally designated by the reference numeral 49 in Figure 14, although in this case the wing 50 deviates somewhat from rectangular relation to the main member 51. A structure of this type is shown at the right of Figure 13 with the main member 51 forming a part of the transverse bulkhead which includes a column 10, a margin plate 52 and bulkhead plates 53 and 54. The wing 50 has secured thereto the plate 55 of a fluted longitudinal defense bulkhead which follows the contour of the side 56 of the hull. A vertical stiffener 57 is shown as disposed to the outside of the plate 55, so as to facilitate the inward collapse of the plate 55 in the case of an explosion between it and the side of the hull. The stiffeners are as far as possible placed on the side of the fluted bulkheads toward the probable explosion zone. In Figure 13 the described right-hand structure will be seen to be duplicated at the left.

While we prefer a bulkhead structure which is fluted throughout, flat bulkhead plates may in some cases be utilized while still retaining the advantages of the fluted intersecting structures. The flat plate is, of course, lighter and cheaper than the corrugated plate. In Figure 15 the flat plate 58 is assumed to replace, for example, the corrugated plate 33 of Figure 9. The plate is provided with a rectangular flange 59, here shown as having a width equal to the distance between the vertical lateral bounding planes of wing 23 of column 10, the flange being butted facewise against the edge of the wing and united therewith through a continuous weld so as to give a tight joint throughout. The outer edge of plate 58 may be carried to the side of the hull, or may be lapped and united with a flat margin plate, or may be provided at its outer edge with a flange like the flange 59 butted facewise against and continuously welded to the inner edge of a fluted margin plate like the margin plate 29 of Figures 8 and 9.

Figure 16:
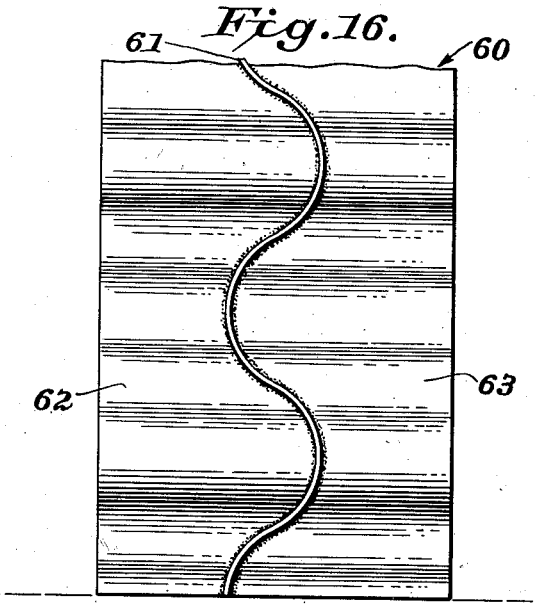
Figure 16 is an elevation of another form of column, or bulkhead intersection, in accordance with the invention.
Figure 18:
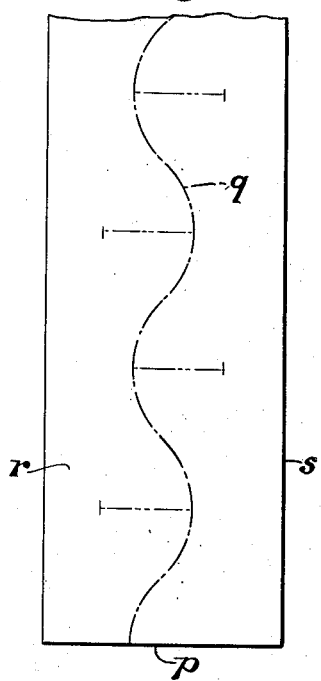
Figure 18 is a face view of a plate illustrating a manner of deriving certain elements of the column shown in Figures 16 and 17, the views being on a reduced scale.
Figure 17:
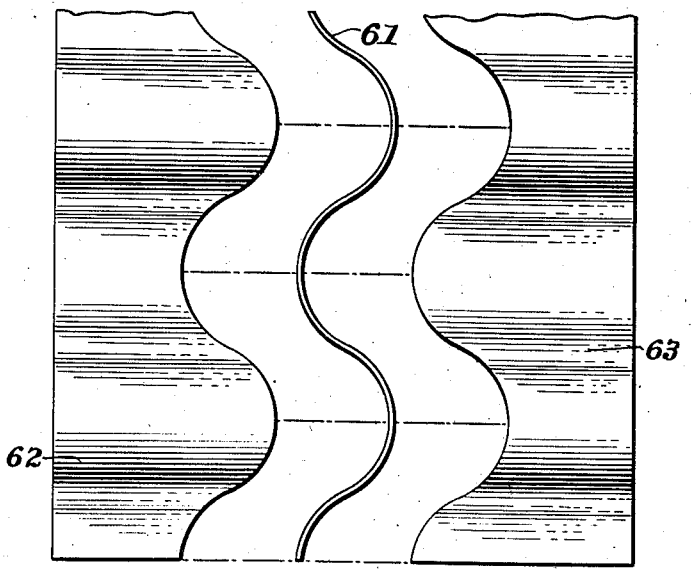
Figure 17 is an elevation showing the column of Figure 16 in process of assembly.

In Figure 16 there is shown a fluted intersecting structure or column in accordance with the invention wherein the members are arcuately, instead of angularly, fluted. The main member 61, which corresponds to the main member 11 of the first embodiment, is undulated symmetrically with its longitudinal central line, and the depth and height of the flutes may be the same as in the first embodiment, and are so shown. The separate wings may be formed by severing a flat plate p along an undulating line q to form the two portions r and s which are then fluted substantially as the member 61 to provide the wings 62 and 63. In Figure 17 these wings are shown as about to be butted against opposite sides of the main member 61 for welding thereto with continuous welds. The interfitted wings mutually support each other as before, and the more or less horizontal components of the flutes serve as before to fulfill the functions of the replaced brackets. This column can, of course, take different forms, just as in the case of the angularly fluted column, and can be used in exactly the same manner and with the same advantages.

From the above, it will be understood that the invention is susceptible of varied embodiment. Other variations in the form and arrangement of parts are possible and are contemplated under the claims which follow.

We claim:

1. Ship structure comprising plate portions in intersecting relationship, each of said portions having flutes extending substantially perpendicularly to their axis of intersection and one of said portions having an edge profiled as the flutes of another and butted against said other with said edge interfitted with the flutes thereof and welded to provide a continuous joint.

2. Ship structure comprising plate portions in intersecting relationship, each of said portions having flutes extending substantially perpendicularly to their axis of intersection and one of said portions having an edge profiled as the flutes of another and butted against said other with said edge interfitted with the flutes thereof and welded to provide a continuous joint, successive flutes of said portions lying substantially between common parallel planes.

3. Ship structure comprising plate portions in intersecting relationship, each of said portions having flutes extending substantially perpendicularly to their axis of intersection and one of said portions having an edge profiled as the flutes of another and butted against said other with said edge interfitted with the flutes thereof and welded to provide a continuous joint, the flutes of said portions having substantially the same contour and successive flutes of said portions lying substantially between common parallel planes.

4. Ship structure comprising plate portions in intersecting relationship, each of said portions having flutes extending substantially perpendicularly to their axis of intersection and one of said portions having an edge profiled as the flutes of another and butted against said other with said edge interfitted with the flutes thereof and welded to provide a continuous joint, said flutes being angular in contour.

5. Ship structure comprising plate portions in intersecting relationship, each of said portions having flutes extending substantially perpendicularly to their axis of intersection and one of said portions having an edge profiled as the flutes of another and butted against said other with said edge interfitted with the flutes thereof and welded to provide a continuous joint, said flutes being arcuate in contour.

6. Ship structure comprising plate portions in intersecting relationship, each of said portions having flutes extending substantially perpendicuportions having an edge profiled as the flutes of another and butted against said other with said edge interfitted with the flutes thereof and welded to provide a continuous joint, each of said flutes being angular in contour and having a flat lateral face parallel to the axis of intersection and internal angles each greater than 90°.

7. Ship structure comprising plate portions in intersecting relationship, each of said portions having flutes extending substantially perpendicularly to their axis of intersection and one of said portions having an edge profiled as the flutes of another and butted against said other with said edge interfitted with the flutes thereof and welded to provide a continuous joint, successive flutes of said portions lying substantially between common parallel planes and each of said flutes being angular in contour and having a flat lateral face parallel to the axis of intersection and internal angles each greater than 90°.

8. Bulkhead structure for ships, comprising an upright plate portion having horizontal flutes, another upright plate portion having horizontal flutes and an edge profiled as the flutes of the first and butted against the first with said edge interfitted with the flutes thereof and welded to provide a continuous joint.

9. Bulkhead structure for ships, comprising an upright plate portion having horizontal flutes, another upright plate portion having horizontal flutes and an edge profiled as the flutes of the first and butted against the first with said edge interfitted with the flutes thereof and welded to provide a continuous joint, successive flutes of said portions lying substantially between common parallel planes.

10. Bulkhead structure for ships, comprising an upright plate portion having horizontal flutes, another upright plate portion having horizontal flutes and an edge profiled as the flutes of the first and butted against the first with said edge interfitted with the flutes thereof and welded to provide a continuous joint, the flutes of said portions having substantially the same contour and successive flutes of said portions lying substantially between common parallel planes.

11. Bulkhead structure for ships, comprising an upright plate portion having horizontal flutes, another upright plate portion having horizontal flutes and an edge profiled as the flutes of the first and butted against the first with said edge interfitted with the flutes thereof and welded to provide a continuous joint, said flutes being angular in contour.

12. Bulkhead structure for ships, comprising an upright plate portion having horizontal flutes, another upright plate portion having horizontal flutes and an edge profiled as the flutes of the first and butted against the first with said edge interfitted with the flutes thereof and welded to provide a continuous joint, said flutes being arcuate in contour.

13. Bulkhead structure for ships, comprising an upright plate portion having horizontal flutes, another upright plate portion having horizontal flutes and an edge profiled as the flutes of the first and butted against the first with said edge interfitted with the flutes thereof and welded to provide a continuous joint, each of said flutes being angular in contour and having a flat lateral face parallel to the axis of intersection and internal angles each greater than 90°.

14. Bulkhead structure for ships, comprising an upright plate portion having horizontal flutes, another upright plate portion having horizontal flutes and an edge profiled as the flutes of the first and butted against the first with said edge interfitted with the flutes thereof and welded to provide a continuous joint, successive flutes of said portions lying substantially between common parallel planes and each of said flutes being angular in contour and having a flat lateral face parallel to the axis of intersection and internal angles each greater than 90°.

15. Bulkhead structure for ships, comprising an upright plate portion which is horizontally fluted, a second upright plate portion which is horizontally fluted and is disposed at one side of the first at substantially right angles thereto, said second plate portion having an edge profiled to interfit with the flutes of the first and welded thereto to provide a continuous joint, and a third horizontally fluted upright plate portion disposed on the other side of the first at substantially right angles thereto and substantially opposite said second plate portion, said third plate portion having an edge profiled and interfitted with the flutes of the first and united therewith in the same manner as the said edge of the first plate portion, whereby to provide a structure which has four wings in cruciform arrangement.

16. Bulkhead structure according to claim 15 wherein the flutes of all the plate portions have substantially the same contour.

17. Bulkhead structure according to claim 15 wherein the flutes of all the plate portions have substantially the same contour and successive flutes of each plate portion lie between substantially the same horizontal planes as successive flutes of the other plate portions.

18. Bulkhead structure according to claim 15 wherein each of the flutes of all the plate portions is angular in contour with a flat side wall in a substantially vertical plane.

19. Bulkhead structure according to claim 15 wherein each of the flutes of all the plate portions is angular with a flat side wall in a substantially vertical plane and each has top and bottom walls each at an internal angle greater than 90° to its side wall.

20. A column for use in the bulkhead structure of ships, comprising an upright plate portion which is horizontally fluted, a second upright plate portion which is horizontally fluted and is disposed at one side of the first at substantially right angles thereto, said second plate portion having an edge profiled to interfit with the flutes of the first and welded thereto to provide a continuous joint, and a third horizontally fluted upright plate portion disposed on the other side of the first at substantially right angles thereto and substantially opposite said second plate portion, said third plate portion having an edge profiled and interfitted with the flutes of the first and united therewith in the same manner as the said edge of the first plate portion, whereby to provide a structure which has four wings in cruciform arrangement.

21. A column according to claim 20 wherein the flutes of all the plate portions have substantially the same contour.

22. A column according to claim 20 wherein the flutes of all the plate portions have substantially the same contour and successive flutes of each plate portion lie between substantially the same horizontal planes as successive flutes of the other plate portions.

23. A column according to claim 20 wherein each of the flutes of all the plate portions is angular in contour with a flat side wall in a substantially vertical plane.

24. A column according to claim 20 wherein each of the flutes of all the plate portions is angular with a flat side wall in a substantially vertical plane, and each has top and bottom walls each at an internal angle greater than 90° to its side wall.

25. In a ship, bulkhead structure including a column; said column comprising an upright plate portion which is horizontally fluted, a second upright plate portion which is horizontally fluted and is disposed at one side of the first at substantially right angles thereto, said second plate portion having an edge profiled to interfit with the flutes of the first and welded thereto to provide a continuous joint, and a third horizontally fluted upright plate portion disposed on the other side of the first at substantially right angles thereto and substantially opposite said second plate portion, said third plate portion having an edge profiled and interfitted with the flutes of the first and united therewith in the same manner as the said edge of the first plate portion, whereby to provide a structure which has four wings in cruciform arrangement; said column being mounted with one set of wings extending fore and aft and the other set extending transversely of the ship, an upright margin plate fixed against an inner side of the ship and having horizontal flutes the same as and aligned with the flutes of the adjacent transverse wing of the column, and a bulkhead plate fluted as said adjacent column wing and margin plate and lapped therewith and secured thereto.

JOSEPH B. WEAVER.
WILLIAM STARLING BURGESS.